United States Patent
Liu et al.

(10) Patent No.: US 7,553,072 B2
(45) Date of Patent: Jun. 30, 2009

(54) PERFORMANCE TESTING APPARATUS FOR HEAT PIPES

(75) Inventors: Tay-Jian Liu, Tu-Cheng (TW);
Chao-Nien Tung, Tu-Cheng (TW);
Chih-Hsien Sun, Tu-Cheng (TW);
Chuen-Shu Hou, Tu-Cheng (TW);
Cheng-Chi Lee, Tu-Cheng (TW)

(73) Assignee: Foxconn Technology Co., Ltd., Tu-Cheng, Taipei Hsien (TW)

( * ) Notice: Subject to any disclaimer, the term of this patent is extended or adjusted under 35 U.S.C. 154(b) by 247 days.

(21) Appl. No.: 11/309,223

(22) Filed: Jul. 13, 2006

(65) Prior Publication Data

US 2007/0133655 A1 Jun. 14, 2007

(30) Foreign Application Priority Data

Dec. 14, 2005 (CN) .................. 2005 1 0120696

(51) Int. Cl.
*G01K 1/16* (2006.01)
*G01K 25/00* (2006.01)
(52) U.S. Cl. .................. 374/44; 374/29; 374/137; 374/208; 374/5; 374/57; 374/147
(58) Field of Classification Search .............. 374/4, 374/5, 29, 30, 31, 32, 39, 43–44, 57, 137, 374/152, 153, 154, 163, 164, 208, 179; 136/200, 136/221
See application file for complete search history.

(56) References Cited

U.S. PATENT DOCUMENTS

| | | | | |
|---|---|---|---|---|
| 4,963,194 | A * | 10/1990 | Mele | 136/221 |
| 5,076,351 | A * | 12/1991 | Munekawa et al. | 165/104.21 |
| 5,226,580 | A * | 7/1993 | Hartle et al. | 228/113 |
| 5,426,495 | A * | 6/1995 | Sawamura et al. | 399/331 |
| 6,262,403 | B1 * | 7/2001 | Tsuchiya et al. | 219/607 |
| 7,147,368 | B2 * | 12/2006 | Chien | 374/147 |
| 2006/0144376 | A1 * | 7/2006 | Gschwind et al. | 123/573 |
| 2006/0256834 | A1 * | 11/2006 | Chang et al. | 374/5 |
| 2007/0006995 | A1 * | 1/2007 | Lin | 165/104.26 |

FOREIGN PATENT DOCUMENTS

TW        M279851        11/2005

* cited by examiner

*Primary Examiner*—Gail Verbitsky
(74) *Attorney, Agent, or Firm*—Frank R. Niranjan

(57) ABSTRACT

A performance testing apparatus for a heat pipe includes an immovable portion having a heating member located therein for heating a heat pipe requiring test. A movable portion is capable of moving relative to the immovable portion. A receiving structure is defined between the immovable portion and the movable portion for receiving the heat pipe therein. At least one temperature sensor is attached to at least one of the immovable portion and the movable portion. The least one temperature sensor has a detecting section exposed in the receiving structure for thermally contacting the heat pipe in the receiving structure to detect a temperature of the heat pipe.

12 Claims, 11 Drawing Sheets

PERFORMANCE TESTING APPARATUS FOR HEAT PIPES

FIELD OF THE INVENTION

The present invention relates generally to testing apparatuses, and more particularly to a performance testing apparatus for heat pipes.

DESCRIPTION OF RELATED ART

It is well known that a heat pipe is generally a vacuum-sealed pipe. A porous wick structure is provided on an inner face of the pipe, and phase changeable working media employed to carry heat is included in the pipe. Generally, according to where the heat is input or output, a heat pipe has three sections, an evaporating section, a condensing section and an adiabatic section between the evaporating section and the condensing section.

In use, the heat pipe transfers heat from one place to another place mainly by exchanging heat through phase change of the working media. Generally, the working media is a liquid such as alcohol or water and so on. When the working media in the evaporating section of the heat pipe is heated up, it evaporates, and a pressure difference is thus produced between the evaporating section and the condensing section in the heat pipe. The resultant vapor with high enthalpy rushes to the condensing section and condenses there. Then the condensed liquid reflows to the evaporating section along the wick structure. This evaporating/condensing cycle continually transfers heat from the evaporating section to the condensing section. Due to the continual phase change of the working media, the evaporating section is kept at or near the same temperature as the condensing section of the heat pipe. Heat pipes are used widely owing to their great heat-transfer capability.

In order to ensure the effective working of the heat pipe, the heat pipe generally requires testing before being used. The maximum heat transfer capacity (Qmax) and the temperature difference ($\Delta T$) between the evaporating section and the condensing section are two important parameters in evaluating performance of the heat pipe. When a predetermined quantity of heat is input into the heat pipe through the evaporating section thereof, thermal resistance (Rth) of the heat pipe can be obtained from $\Delta T$, and the performance of the heat pipe can be evaluated. The relationship between these parameters Qmax, Rth and $\Delta T$ is Rth=$\Delta T$/Qmax. When the input quantity of heat exceeds the maximum heat transfer capacity (Qmax), the heat cannot be timely transferred from the evaporating section to the condensing section, and the temperature of the evaporating section increases rapidly.

A typical method for testing the performance of a heat pipe is to first insert the evaporating section of the heat pipe into a liquid at constant temperature; after a period of time the temperature of the heat pipe will become stable, then a temperature sensor such as a thermocouple, a resistance thermometer detector (RTD) or the like can be used to measure $\Delta T$ between the liquid and the condensing section of the heat pipe to evaluate the performance of the heat pipe. However, Rth and Qmax can not be obtained by this test, and the performance of the heat pipe can not be reflected exactly by this test.

Referring to FIG. 7, a related performance testing apparatus for heat pipes is shown. The apparatus has a resistance wire 1 coiling round an evaporating section 2a of a heat pipe 2, and a water cooling sleeve 3 functioning as a heat sink and enclosing a condensing section 2b of the heat pipe 2. In use, electrical power controlled by a voltmeter and an ammeter flows through the resistance wire 1, whereby the resistance wire 1 heats the evaporating section 2a of the heat pipe 2. At the same time, by controlling flow rate and temperature of cooling liquid entering the cooling sleeve 3, the heat input at the evaporating section 2a can be removed from the heat pipe 2 by the cooling liquid at the condensing section 2b, whereby a stable operating temperature of adiabatic section 2c of the heat pipe 2 is obtained. Therefore, Qmax of the heat pipe 2 and $\Delta T$ between the evaporating section 2a and the condensing section 2b can be obtained by temperature sensors 4 at different positions on the heat pipe 2.

However, in the test, the related testing apparatus has the following drawbacks: a) it is difficult to accurately determine lengths of the evaporating section 2a and the condensing section 2b which are important factors in determining the performance of the heat pipe 2; b) heat transference and temperature measurement may easily be affected by environmental conditions; and, c) it is difficult to achieve sufficiently intimate contact between the heat pipe and the heat source and between the heat pipe and the heat sink, which results in uneven performance test results of the heat pipe. Furthermore, due to awkward and laborious assembly and disassembly in the test, the testing apparatus can be only used in the laboratory, and can not be used in the mass production of heat pipes.

In mass production of heat pipes, a large number of performance tests are needed, and the apparatus is used frequently over a long period of time; therefore, the apparatus not only requires good testing accuracy, but also requires easy and accurate assembly to the heat pipes to be tested. The testing apparatus affects the yield and cost of the heat pipes directly; therefore, testing accuracy, facility, speed, consistency, reproducibility and reliability need to be considered when choosing the testing apparatus. Therefore, the testing apparatus needs to be improved in order to meet the demand for mass production of heat pipes.

What is needed, therefore, is a high performance testing apparatus for heat pipes suitable for use in mass production of heat pipes.

SUMMARY OF THE INVENTION

A performance testing apparatus for a heat pipe in accordance with a preferred embodiment of the present invention comprises an immovable portion having a heating member located therein for heating an evaporating section of a heat pipe requiring testing. A movable portion is capable of moving relative to the immovable portion. A receiving structure is defined between the immovable portion and the movable portion for receiving the evaporating section of the heat pipe therein. At least one temperature sensor is attached to at least one of the immovable portion and the movable portion. The at least one temperature sensor has a portion thereof exposed in the receiving structure for thermally contacting the condensing section of the heat pipe in the receiving structure to detect a temperature of the heat pipe. The movable portion is driven by a driving device such as a step motor to move towards or away from the immovable portion. A spring coil is compressed to exert a force on the at least one temperature sensor towards an intimate contact with the evaporating section of the heat pipe.

Other advantages and novel features will become more apparent from the following detailed description of preferred embodiments when taken in conjunction with the accompanying drawings, in which:

BRIEF DESCRIPTION OF THE DRAWINGS

Many aspects of the present apparatus can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

DETAILED DESCRIPTION OF THE INVENTION

Figure 1:
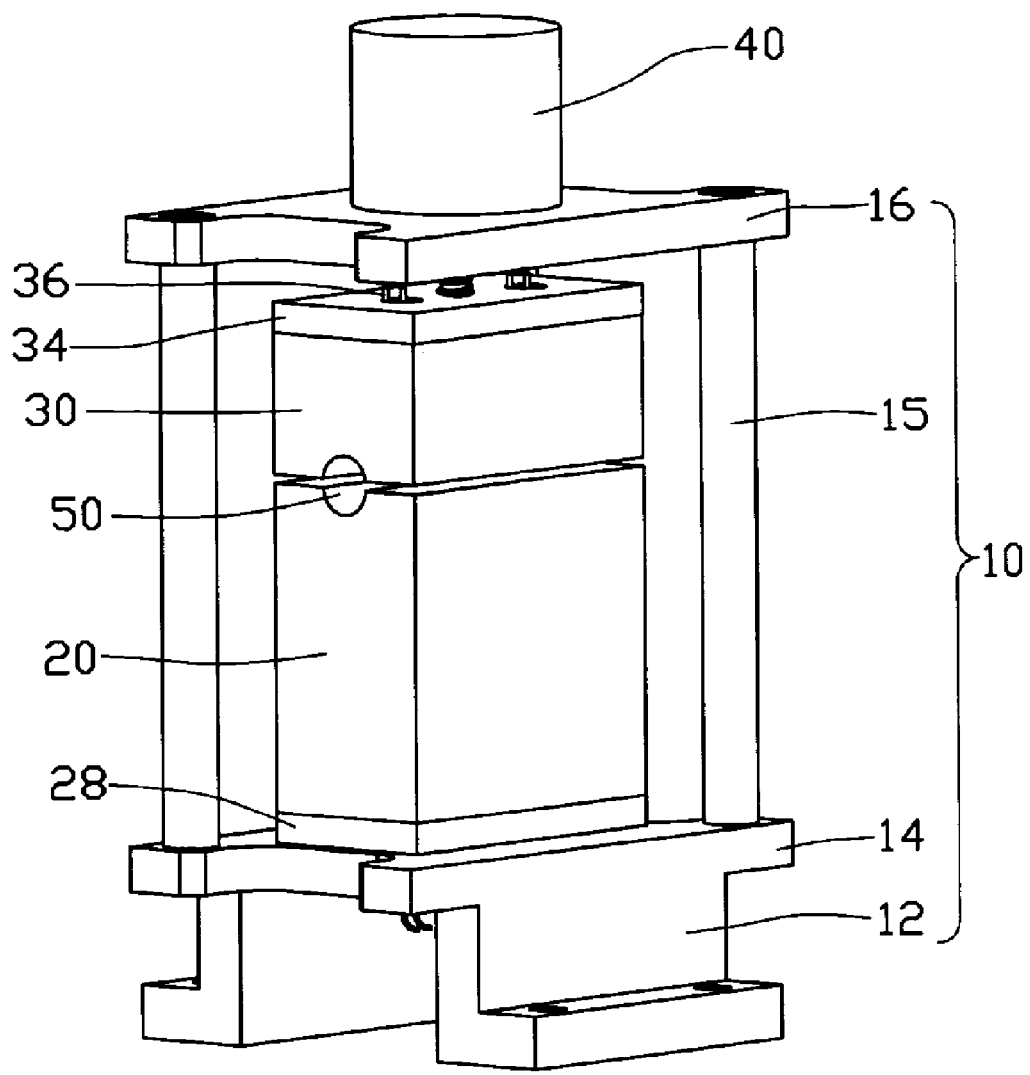
FIG. 1 is an assembled view of a performance testing apparatus for heat pipes in accordance with a preferred embodiment of the present invention.
Figure 2:
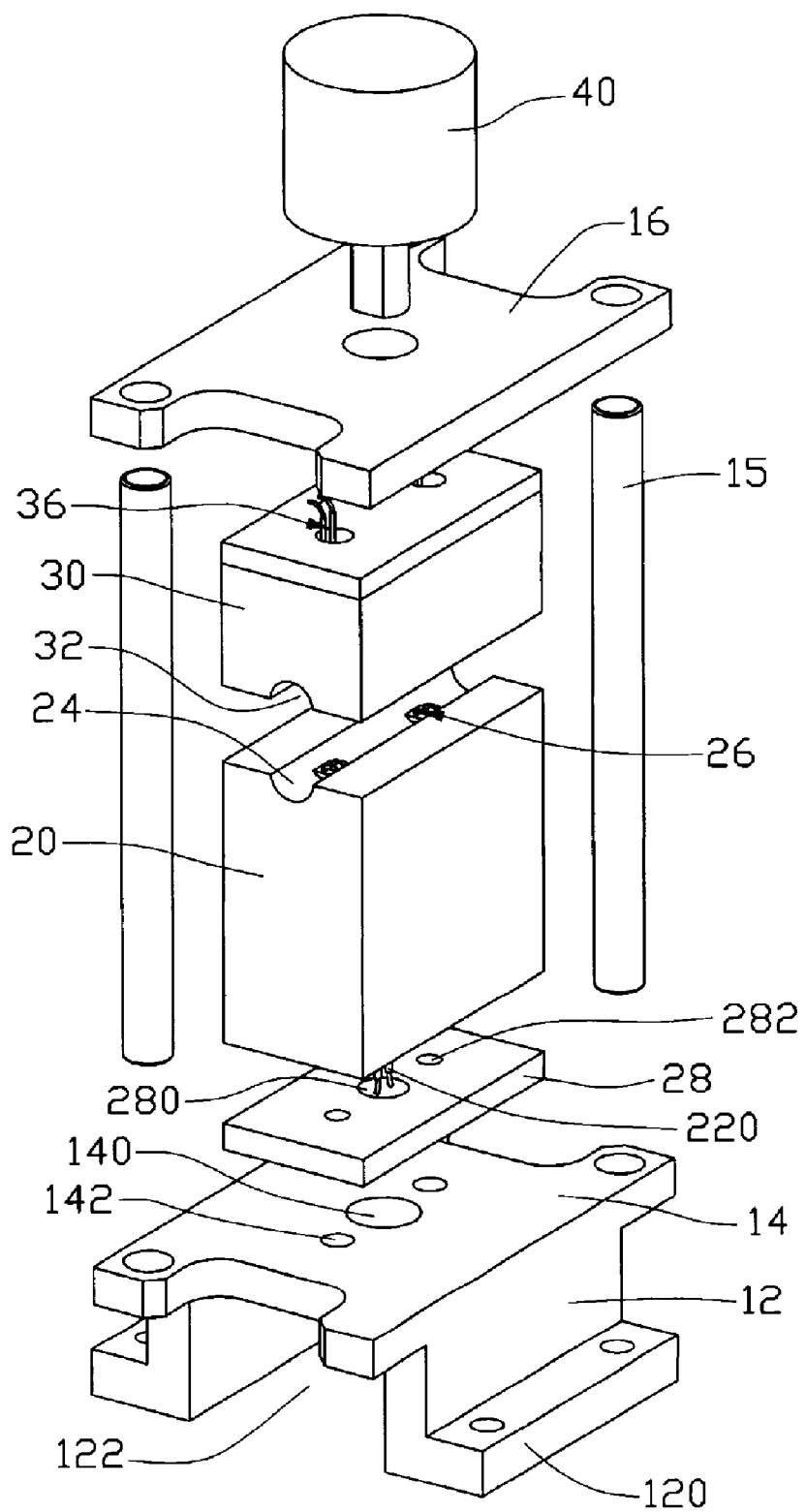
FIG. 2 is an exploded, isometric view of the testing apparatus of FIG. 1.

Referring to FIGS. 1 and 2, a performance testing apparatus for heat pipes comprises an immovable portion 20 and a movable portion 30 movably mounted on the immovable portion 20.

Figure 6A:
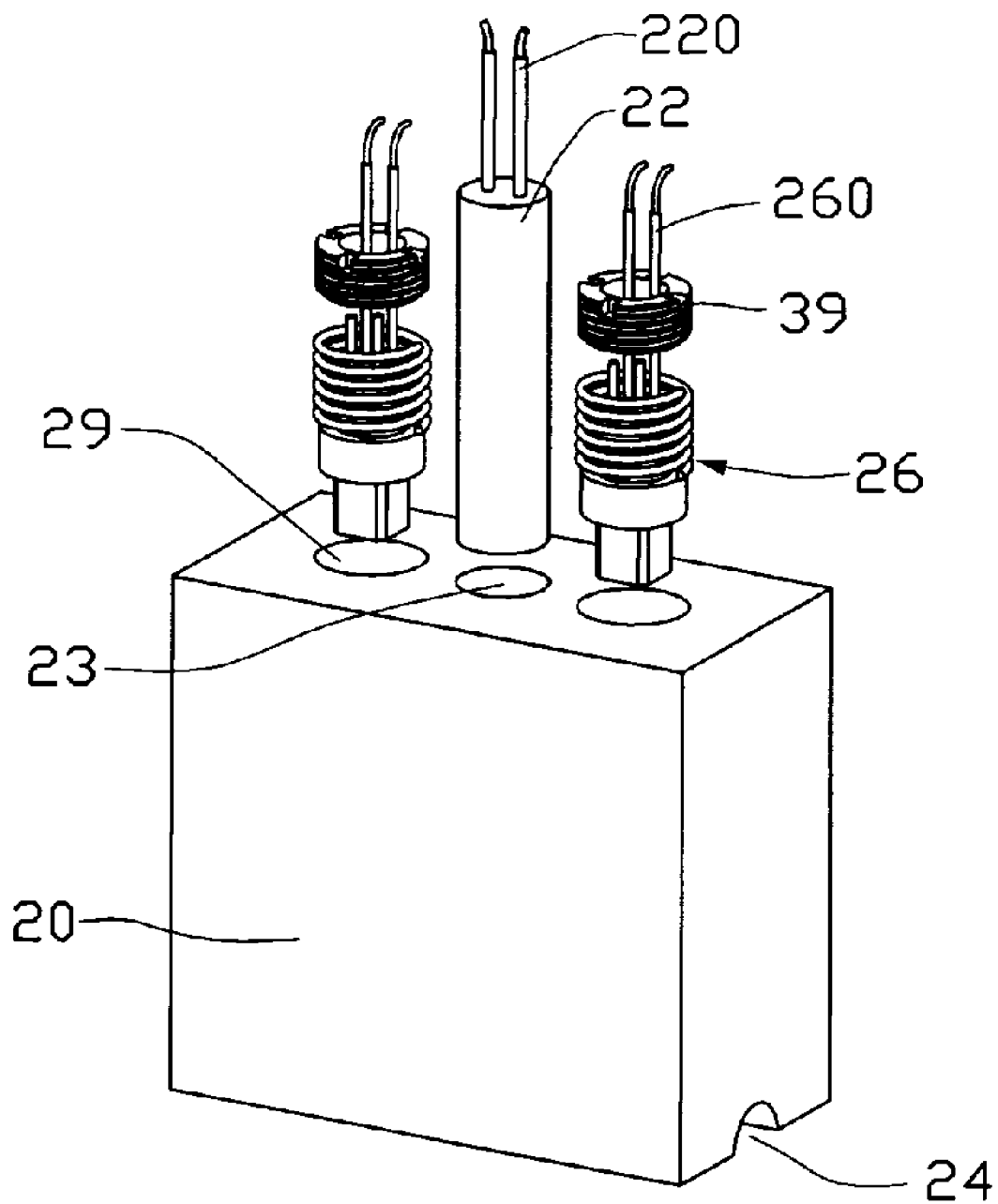
FIG. 6A shows an immovable portion and two temperature sensors of the testing apparatus of FIG. 2.
Figure 6B:
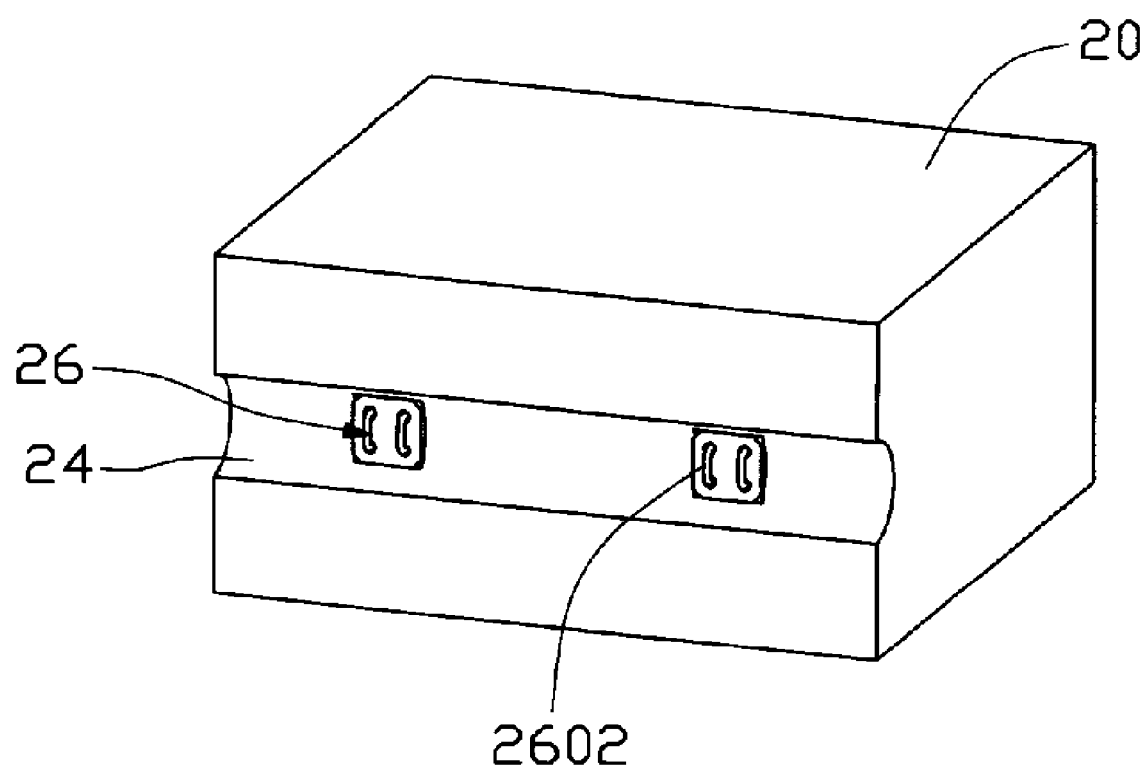
FIG. 6B is an assembled view of FIG. 6A, viewed from a different aspect.
Figure 7:
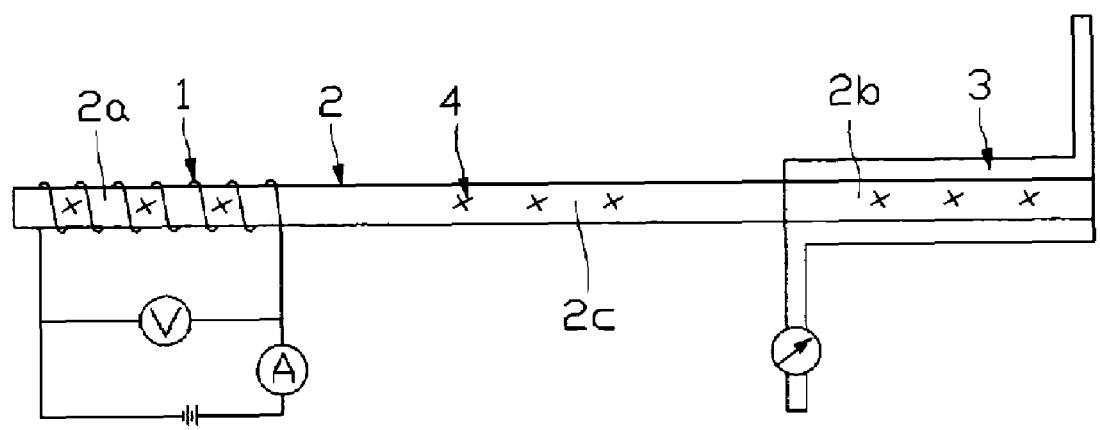
FIG. 7 is a performance testing apparatus for heat pipes in accordance with related art.

Referring also to FIGS. 6A and 6B, the immovable portion 20 has good heat conductivity and is held on a platform of a supporting member such as a testing table or so on. A heating member 22 such as an immersion heater, resistance coil, quartz tube and Positive temperature coefficient (PTC) material or the like is embedded in the immovable portion 20. The immovable portion 20 defines a hole 23 through a center of a bottom thereof. In the case, the heating member 22 is an elongated cylinder. The heating member 22 is accommodated in the hole 23 of the immovable portion 20. Two spaced wires 220 extend from an end of the heating member 20 to connect with a power supply (not shown). The immovable portion 20 has a heating groove 24 defined in a top face thereof, for receiving an evaporating section of the heat pipe to be tested therein. Two temperature sensors 26 are inserted into the immovable portion 20 from a bottom thereof so as to position detecting portions 2602 of the sensors 26 in the heating groove 24. The detecting portions 2602 are capable of automatically contacting the heat pipe in order to detect a temperature of the evaporating section of the heat pipe. In order to prevent heat in the immovable portion 20 from spreading to the supporting member, an insulating plate is disposed on the supporting member for thermally insulating the testing apparatus from the supporting member.

The movable portion 30, corresponding to the heating groove 24 of the immovable portion 20, has a positioning groove 32 defined therein, whereby a testing channel 50 is cooperatively defined by the heating groove 24 and the positioning groove 32 when the movable portion 30 moves to reach the immovable portion 20. Thus, an intimate contact between the heat pipe and the movable and immovable portions 30, 20 defining the channel 50 can be realized, thereby reducing heat resistance between the heat pipe and the movable and immovable portions 30, 20. Two temperature sensors 36 are inserted into the movable portion 30 from a top thereof to reach a position wherein detecting portions of the sensors 36 are located in the positioning groove 32. The detecting portions are capable of automatically contacting the heat pipe to detect the temperature of the evaporating section of the heat pipe.

The channel 50 as shown in the preferred embodiment has a circular cross section enabling it to receive the evaporating section of the heat pipe having a correspondingly circular cross section. Alternatively, the channel 50 can have a rectangular cross section where the evaporating section of the heat pipe also has a flat rectangular configuration.

In order to ensure that the heat pipe is in close contact with the movable and immovable portions 30, 20, a supporting frame 10 is used to support and assemble the immovable and movable portions 20, 30. The immovable portion 20 is fixed on the supporting frame 10. A driving device 40 is installed on the supporting frame 10 to drive the movable portion 30 to make accurate linear movement relative to the immovable portion 20 along a vertical direction, thereby realizing the intimate contact between the heat pipe and the movable and immovable portions 30, 20. In this manner, heat resistance between the evaporating section of the heat pipe and the movable and immovable portions 30, 20 can be minimized.

The supporting frame 10 comprises a seat 12 which may be an electromagnetic holding chuck, by which the testing apparatus can be easily fixed at any desired position which is provided with a platform made of ferrous material. The seat 12 comprises a first plate 14 at a top thereof. A second plate 16 hovers over the first plate 14. Pluralities of supporting rods 15 interconnect the first and second plates 14, 16 for supporting the second plate 16 above the first plate 14. The seat 12, the second plate 16 and the rods 15 constitute the supporting frame 10 for assembling and positioning the immovable and movable portions 20, 30 therein. The immovable portion 20 is fixed on the first plate 14. In order to prevent heat in the immovable portion 20 from spreading to the first plate 14, an insulating plate 28 is located at the bottom of the immovable portion 20. The first plate 14 and the insulating plate 28 define corresponding through holes 140, 280 for the wire 220 of the heat member 22 of the immovable portion 20 to extend therethrough, and spaced apertures 142, 282 to allow wires 260 of the temperature sensors 26 to extend therethrough to connect with a monitoring computer (not shown).

The driving device 40 in this preferred embodiment is a step motor, although it can be easily apprehended by those skilled in the art that the driving device 40 can also be a pneumatic cylinder or a hydraulic cylinder. The driving device 40 is installed on the second plate 16 of the supporting frame 10. The driving device 40 is fixed to the second plate 16 above the movable portion 30. A shaft (not labeled) of the driving device 40 extends through the second plate 16 of the supporting frame 10. The shaft has a threaded end (not shown) threadedly engaging with a bolt 42 secured to a board 34 of the movable portion 30 (also see FIGS. 3A and 3B). The board 34 is fastened to the movable portion 30. When the shaft rotates, the bolt 42 with the board 34 and the movable portion 30 move upwardly or downwardly. Two through apertures 342 are defined in the board 34 of the movable portion 30 to allow wires 360 of the temperature sensors 36 to extend therethrough to connect with the monitoring computer. In use, the driving device 40 accurately drives the movable portion 30 to move linearly relative to the immovable portion 20. For example, the movable portion 30 can be driven to depart a certain distance such as 5 millimeters from the immovable portion 20 to facilitate the insertion of the evaporating section of the heat pipe being tested into the channel 50 or withdrawn from the channel 50 after the heat pipe has been tested. Or in another example, the movable portion 30 can be driven to move toward the immovable portion 20 to thereby realize an intimate contact between the evaporating section of the heat pipe and the immovable and movable portions 20, 30 during the test. Accordingly, the requirements for testing, i.e. accuracy, ease of use and speed, can be realized by a testing apparatus in accordance with the present invention.

It can be understood, positions of the immovable portion 20 and the movable portion 30 can be exchanged, i.e., the movable portion 30 is located on the first plate 14 of the supporting frame 10, and the immovable portion 20 is fixed to the second plate 16 of the supporting frame 10, and the driving device 40 is positioned to be adjacent to the movable portion 20. Alternatively, the driving device 40 can be installed to the immovable portion 20. Otherwise, each of the immovable and movable portions 20, 30 may have one driving device 40 installed thereon to move them toward/away from each other.

Figure 3A:
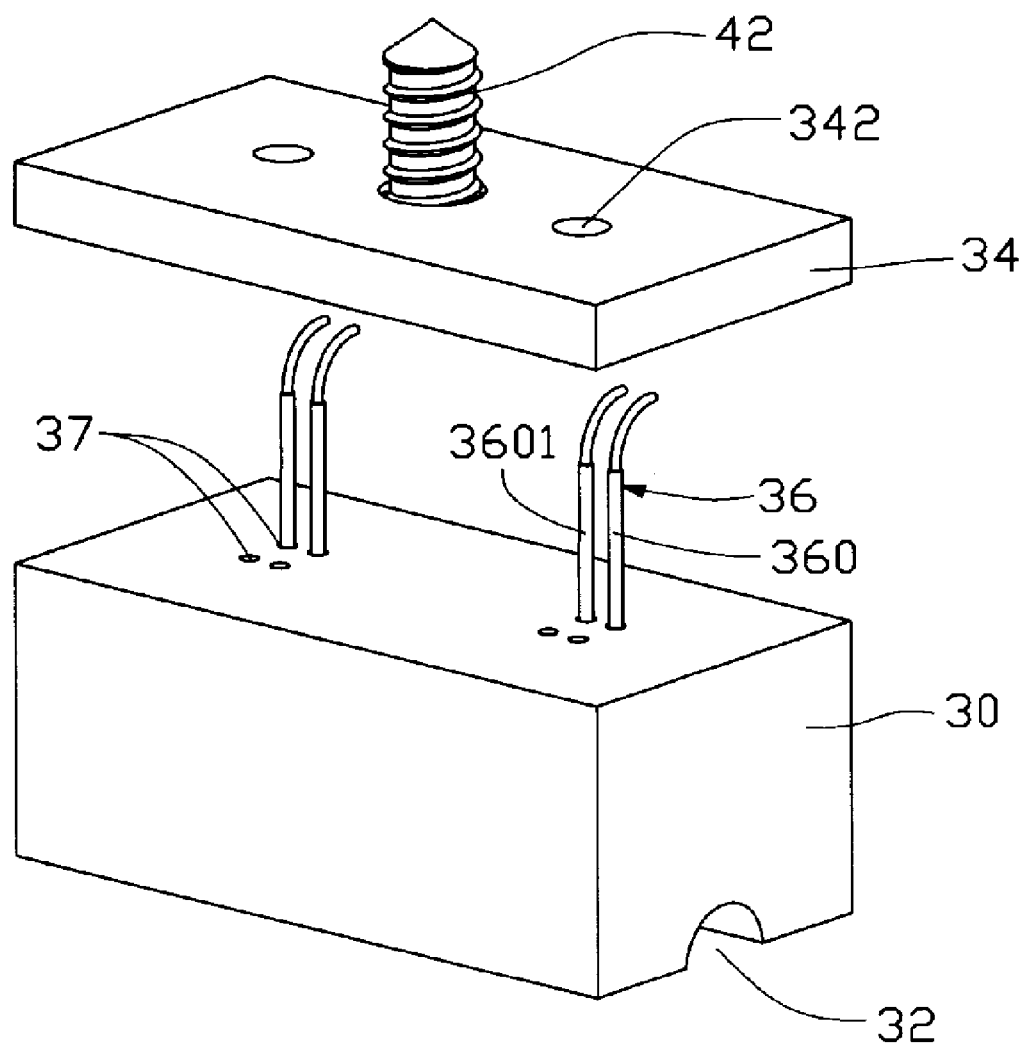
FIG. 3A shows a movable portion and two temperature sensors of the testing apparatus of FIG. 2.
Figure 3B:
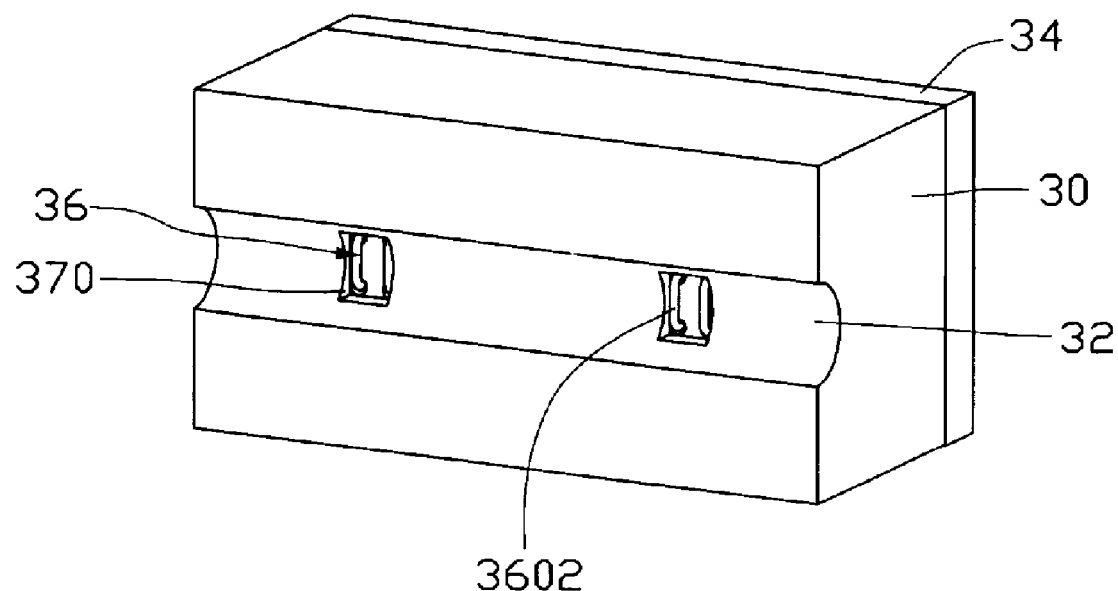
FIG. 3B is an assembled view of FIG. 3A, viewed from another aspect.

Referring to FIGS. 3A and 3B, the movable portion 30 and two temperature sensors 36 in accordance with a first embodiment of the present invention are illustrated. In this case, the two sensors 36 which work independently are substantially vertically mounted in two different places on the movable portion 30. Each of the sensors 36 has two wires 360 inserted in two pairs of through apertures 37 vertically extending through the movable portion 30, wherein working (detecting) sections 3602 of the two wires 360 are located in a concave 370 communicating with the groove 32. Each of the two wires 360 has two vertical sections 3601 extending into a corresponding pair of apertures 37 of the movable portion 30. The working section 3602 interconnects bottom ends of two corresponding vertical sections 3601. One the of vertical sections 3601 of each wire 360 has an upper extension extending through a corresponding aperture 342 in the board 34 to connect with the monitoring computer.

In use, the evaporating section of the heat pipe is received in the channel 50 when the movable portion 30 moves away from the immovable portion 20. The evaporating section of the heat pipe is put in the heating groove 24 of the immovable portion 20. Then the movable portion 30 moves to reach the immovable portion 20 so that the evaporating section of the heat pipe is tightly fitted into the channel 50. The sensors 26, 36 are in thermal contact with the evaporating section of the heat pipe; therefore, the sensors 26, 36 work to accurately send detected temperatures from the evaporating section of the heat pipe to the monitoring computer. Based on the temperatures obtained by the plurality of sensors 26, 36, an average temperature can be obtained by the monitoring computer very quickly; therefore, performance of the heat pipe can be quickly decided.

In the embodiment, in order to help the evaporating section of the heat pipe to have an intimate contact with the working sections 3602 of the sensors 36, each of the working sections 3602 is formed to have a curved configuration with a curvature corresponding to that of the evaporating section of the heat pipe.

Figure 4A:
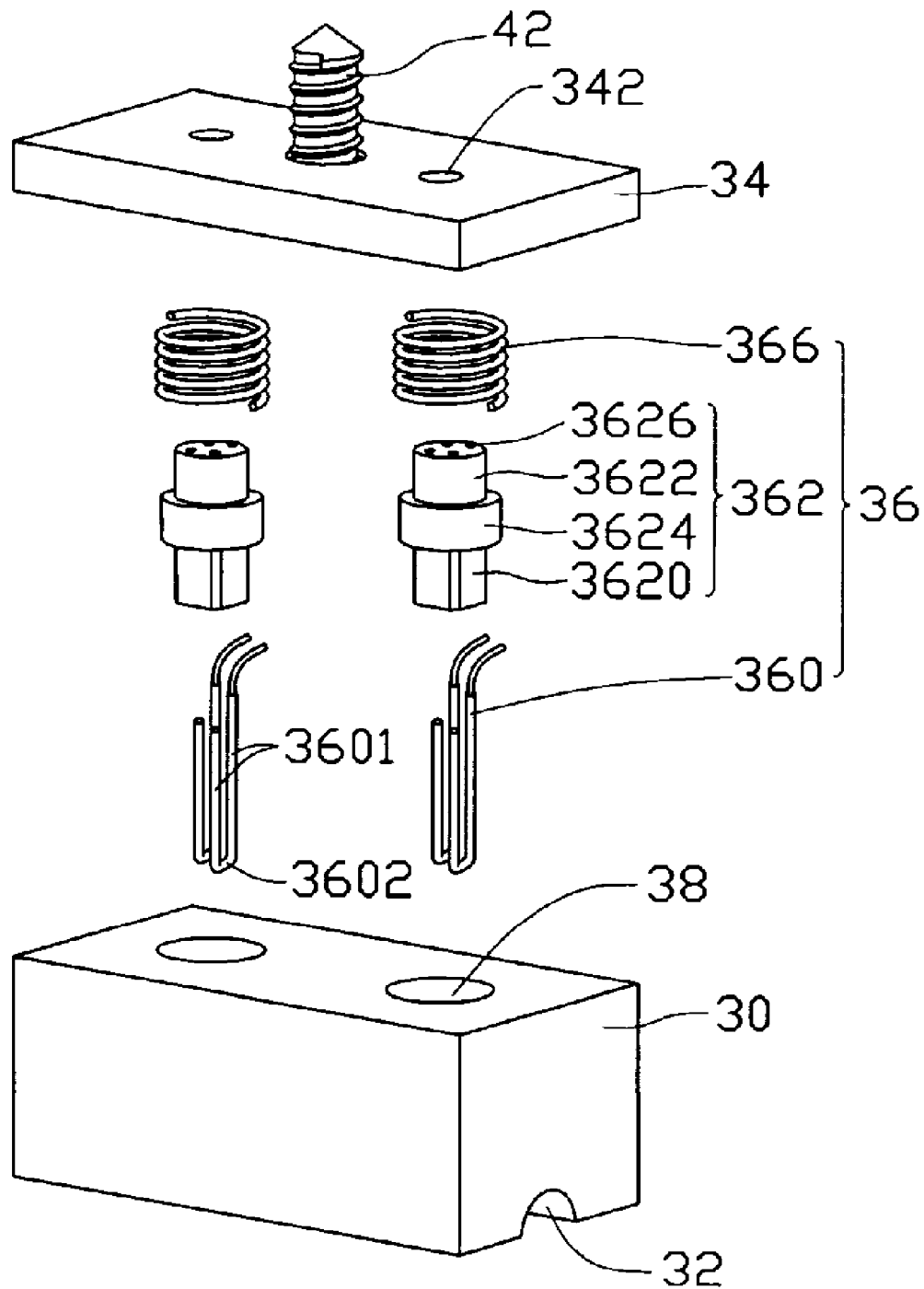
FIG. 4A shows a movable portion and two temperature sensors in accordance with a second embodiment of the present invention.
Figure 4B:
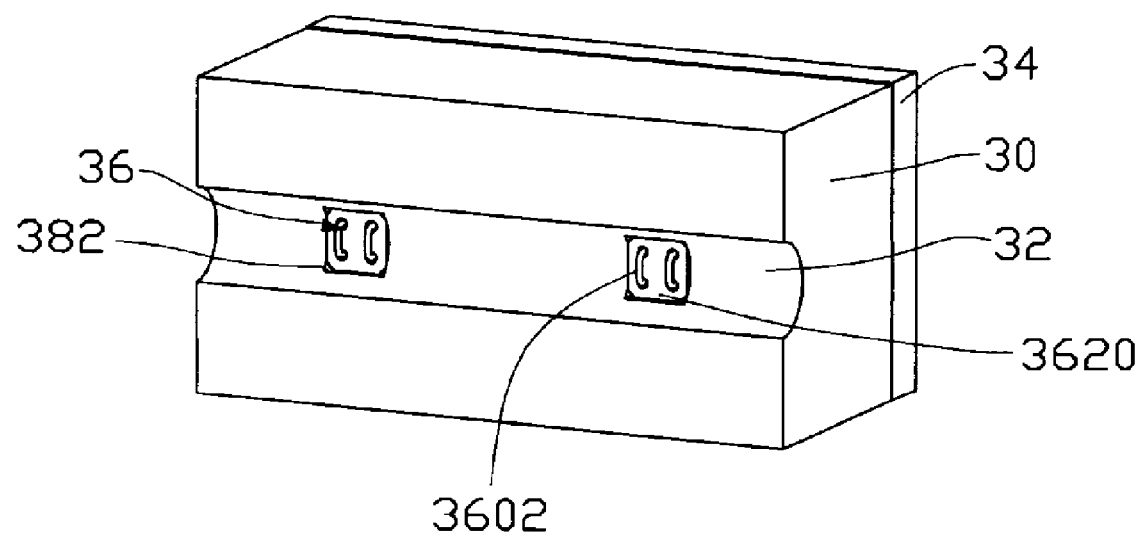
FIG. 4B is an assembled view of FIG. 4A, viewed from another aspect.

Referring to FIGS. 4A and 4B, the movable portion 30 and two temperature sensors 36 in accordance with a second embodiment of the present invention are shown. The difference from the first embodiment is that the movable portion 30 has two through holes 38 substantially vertically extending therethrough, and a temperature sensor 36 is inserted into each of the two through holes 38. In this embodiment, the through holes 38 communicate with the positioning groove 32 in different positions of the movable portion 30. Each of the two temperature sensors 36 comprises a positioning socket 362 and a pair of thermocouple wires 360 fitted in the socket 362. The socket 362 comprises a square column 3620, a circular column 3622 above the square column 3620, and a circular collar 3624 between the square column 3620 and the circular column 3622. The socket 362 has two pairs of through apertures 3626 extending from a bottom of the square column 3620 to a top of the circular column 3622. A spring coil 366 surrounds the circular column 3622 of the socket 362. Each wire 360 has two vertical sections 3601 extending into the apertures 3626 and the working section 3602 between the two vertical sections 3601 thereof. The working sections 3602 are located at the bottom of the square column 3620 and separated from each other. The vertical sections 3601 are each secured in a corresponding aperture 3626. The wires 360 extend upwardly from top ends of corresponding vertical sections 3601 through the apertures in 342 in the board 34 to connect with the monitoring computer. The through hole 38 has a portion 382 adjacent to the groove 32 being square to thereby ensure the square column 3620 to be fitted therein, and a round portion (not labeled) above the square portion 382 to ensure the collar 3624 and the spring coil 362 to be fitted therein. When the collar 3624 abuts against top of the portion 382, the circular column 3622 and a lower portion of spring coil 362 are received in the through hole 38. The board 34 is secured on the movable portion 30. The spring coil 366 is compressed between the board 34 and the movable portion 30. Here, the working sections 3602 of the wires 360 are pushed by the spring coil 366 toward the groove 32. The use of the testing apparatus having the sensors 36 and movable portion 30 in accordance with the second embodiment is similar to that of the first embodiment.

In this embodiment, since the temperature sensors 36 are telescopically fitted into the through holes 38 and the working sections 3602 of the temperature sensors 36 are pushed by the spring coils 366 toward the groove 32, a reliable intimate contact between the working sections 3602 and the evaporating section of the heat pipe can be ensured.

Figure 5A:
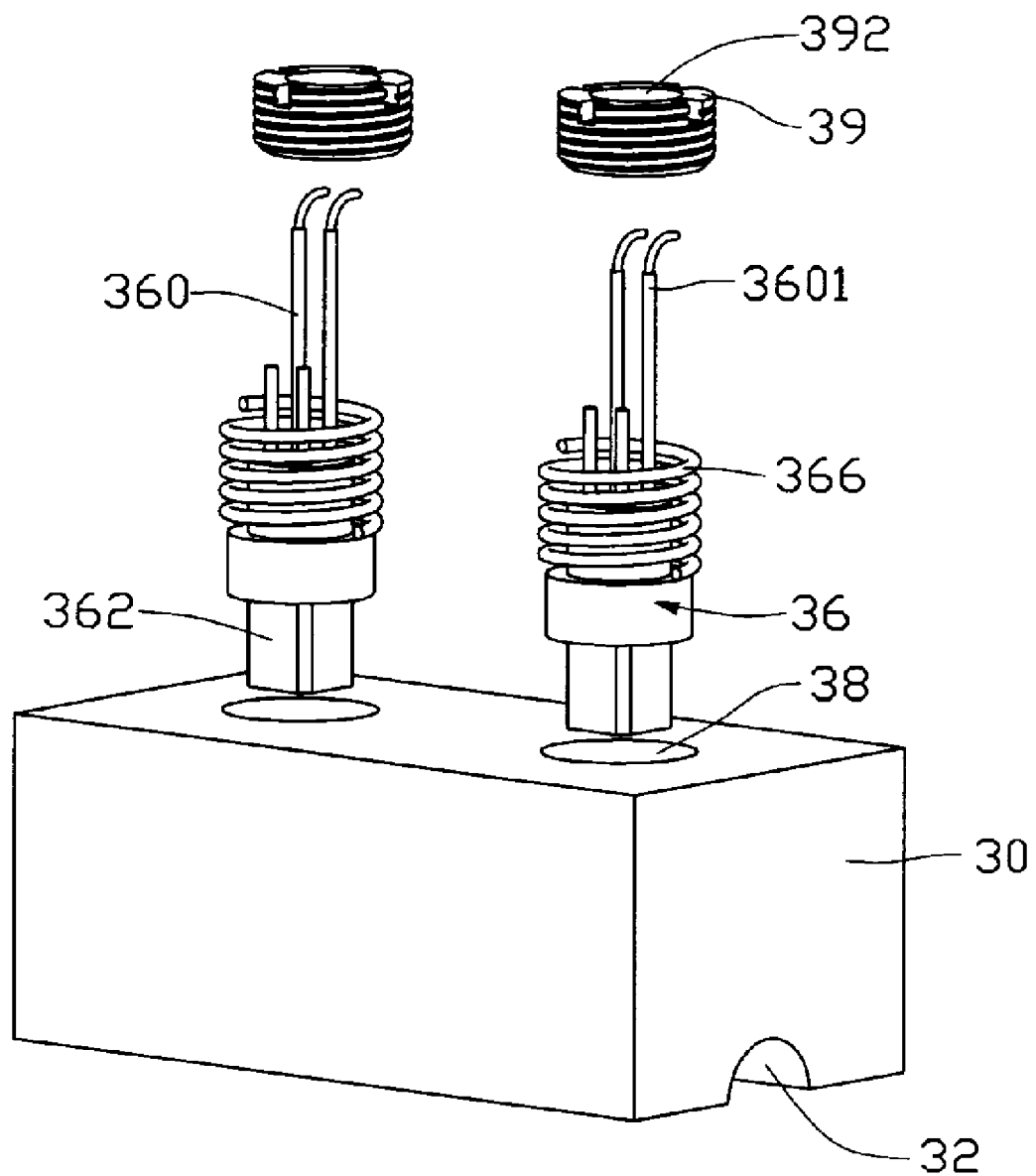
FIG. 5A shows a movable portion and two temperature sensors in accordance with a third embodiment of the present invention.
Figure 5B:
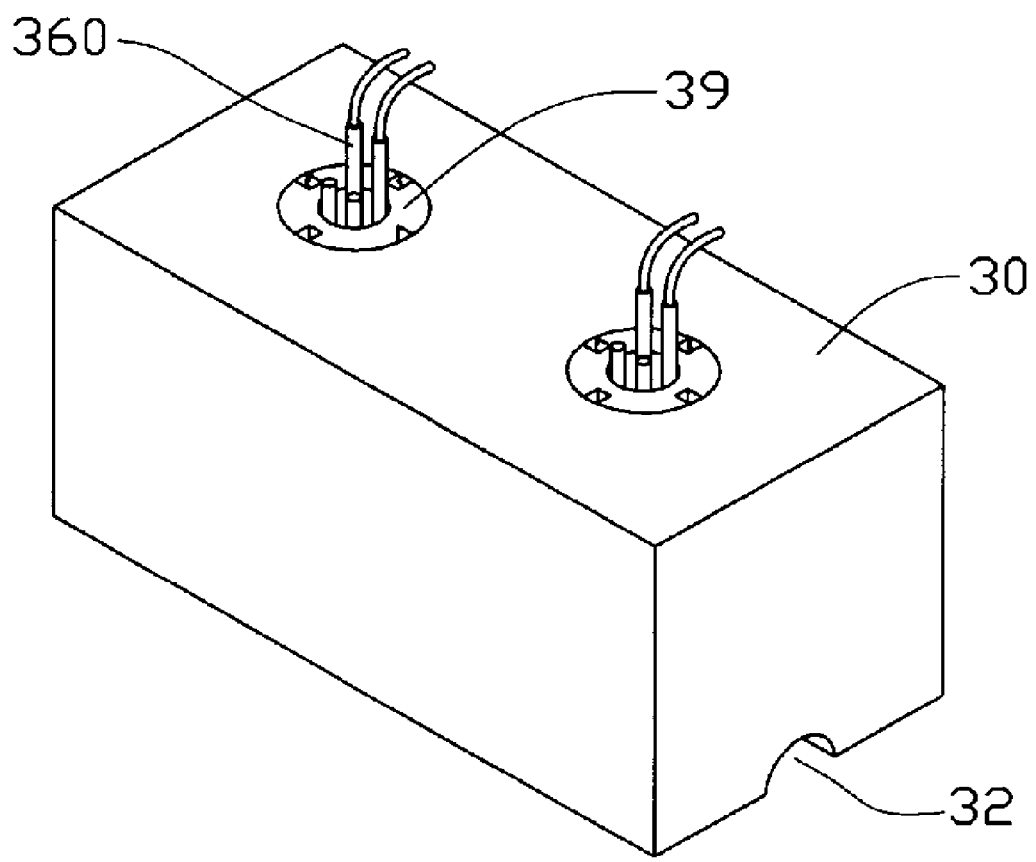
FIG. 5B is an assembled view of FIG. 5A.

Referring to FIGS. 5A and 5B, the movable portion 30 and two temperature sensors 36 in accordance with a third embodiment of the present invention are shown. The third embodiment is similar to the second embodiment; the main difference from the second embodiment is that in the temperature sensor 36 the spring coil 366 is compressed by a screw 39 engaged in the hole 38 of the movable portion 30. The hole 38 has a thread (not shown) in a top of an inner face thereof. The screw 39 has a thread in a periphery face thereof and a through opening 392 extending through a center thereof. The upper ends of the wires 360 extend through the opening 392 of the screw 39 to connect with the monitoring computer. The screw 39 is located upon a corresponding spring coil 366 and engaged in the hole 38, thereby pushing the spring coil 366 together with the temperature sensor 36 towards the groove 32 of the movable portion 30. By this design, the board 34 used in the second embodiment can be omitted. And the bolt 42 in the previous embodiments can be directly secured to the movable portion 30 between the temperature sensors 36, although it is not shown in FIGS. 5A and 5B.

According to the third embodiment, the temperature sensor 36 is positioned on the hole 38 of the movable portion 30 via the screw 39 engaging in the hole 38. Therefore, 1) it is easy to install/remove the temperature sensor 36 to/from the movable portion 30; and, 2) it is easy to adjust the compression force of the spring coils to thereby provide suitable force on the working sections 3602 of the wires 360, whereby the working sections 3602 can have an optimal contact with the evaporating section of heat pipe.

In all the embodiments of the present invention, the wires 360 are perpendicular to the groove 32; and, they can be oriented with other angles in respective to the groove 32, so long as the wires 360 have an intimate contact with the evaporating section of the heat pipe when the movable portion 30 moves toward the immovable portion 20.

The temperature sensors 26 and the immovable portion 20 can have configuration and relationship similar to that of the temperature sensors 36 and the movable portion 30 as illustrated in the second and third embodiments. Referring to FIGS. 6A and 6B, the temperature sensors 26 are identical to the temperature sensors 36 of the third embodiment and each comprise two wires 260 each having the working section 2602 between two vertical sections (not labeled) thereof; a receiving hole 29 of the immovable portion 20 is identical to the hole 38 of the movable portion 30 in the second embodiment.

In the present invention, the movable portion 30 has the driving device 40 installed thereon to thereby drive the movable portion 30 to accurately make linear movement relative to the immovable portion 20; thus, the evaporating section of the heat pipe needing to be tested can be accurately and quickly positioned between the two portions 20, 30, and can contact with the movable and immovable portions 30, 20 intimately, therefore the heat provided by the heating member 22 of the immovable portion 20 can be sufficiently absorbed by evaporating section of the heat pipe. Furthermore, the temperature sensors 26, 36 are positioned in the holes of the immovable and movable portions 20, 30, and the temperature sensors 26, 36 intimately contact the evaporating section of the heat pipe under optimal conditions, after the movable portion 30 moves to reach the immovable portion 20. In comparison with the conventional testing apparatuses, the testing apparatus of the present invention can accurately, quickly and easily test the performance of the heat pipe. Therefore, the testing apparatus enables mass production of the heat pipes.

Furthermore, the apparatus has a plurality of temperature sensors synchronously detecting temperature of the evaporating section of the heat pipe; therefore, an average temperature of the evaporating section can be obtained to indicate the performance of the heat pipe veraciously.

Additionally, in the present invention, in order to lower cost of the testing apparatus, the immovable portion 30, the insulating plate 28, the board 34 and the positioning socket 362 can be made from low-cost material such as PE (Polyethylene), ABS (Acrylonitrile Butadiene Styrene), PF (Phenol-Formaldehyde), PTFE (Polytetrafluoroethylene) and so on. The immovable portion 20 can be made from copper (Cu) or aluminum (Al). The immovable portion 20 can have silver (Ag) or nickel (Ni) plated on an inner face defining the groove 24 to prevent the oxidization of the inner face.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A performance testing apparatus for a heat pipe comprising:
   an immovable portion having a heating member located therein for heating an evaporating section of the heat pipe;
   a movable portion capable of moving relative to the immovable portion;
   a receiving structure being defined between the immovable portion and the movable portion for receiving the evaporating section of the heat pipe therein; and
   at least one temperature sensor being attached to at least one of the immovable portion and the movable portion for thermally contacting the heat pipe in the receiving structure for detecting temperature of the heat pipe;
   wherein the receiving structure is a channel defined between the immovable portion and the movable portion;
   wherein the at least one temperature sensor has a detecting section thereof exposed to the channel;
   wherein at least one of the immovable portion and the movable portion has at least one positioning structure communicating with the channel, the at least one temperature sensor being positioned in the at least one positioning structure;
   wherein the at least one temperature sensor comprises two wires, each of the two wires comprising first and second sections and the detecting section being located between the first and second sections;
   wherein the at least one temperature sensor is positioned in a positioning socket movably fitted in a through hole of the positioning structure of at least one of the immovable portion and the movable portion; and
   wherein the positioning socket defines four through apertures therethrough, and wherein each of the wires of the at least one temperature sensor has the first section thereof fitted in one of the through apertures, the second section fitted in another through aperture, and the detecting section located at a bottom of the socket for contacting with the heat pipe, and wherein an end of the second section extends away from the another through hole for connecting with a monitoring computer.

2. The testing apparatus of claim 1, wherein the channel is cooperatively defined by a heating groove defined in a face of the immovable portion and a positioning groove defined in a face of the movable portion.

3. The testing apparatus of claim 1, wherein the positioning socket comprises a square column, a circular column and a circular collar between the square and circular columns, and wherein the through hole of the positioning structure has square and circular sections corresponding to the square column and the circular column of the socket, respectively.

4. The testing apparatus of claim 3, wherein the positioning socket has a spring coil surrounding the circular column of the socket and movably received in the through hole of the positioning portion.

5. The testing apparatus of claim 4, wherein the at least a temperature sensor is fixed in the through hole of the positioning structure via a board covering the positioning structure, and wherein the ends of the wires of the at least one temperature sensor extend through the board.

6. The testing apparatus of claim 4, wherein the at least one temperature sensor is secured in the through hole of the positioning structure via a screw engaged in the through hole, the ends of the wires of the at least a temperature sensor extending through the screw.

7. The testing apparatus of claim 1, wherein the heating member is accommodated in a hole defined in the immovable portion, and extends two wires to connect with a power supplier.

8. A performance testing apparatus for a heat pipe and a supporting device for positioning the testing apparatus, comprising:
- an immovable portion having a heating member located therein for heating the heat pipe;
- a movable portion being movably mounted on the immovable portion;
- a receiving structure being defined between the immovable portion and the movable portion for receiving the heat pipe therein;
- at least one temperature sensor telescopically received in at least one of be immovable and movable portions, and having a detecting section thereof exposed in the receiving structure for thermally contacting the heat pipe in the receiving structure to detect a temperature of the heat pipe; and
- the supporting device comprises a seat for positioning the testing apparatus at a required position, the seat having a first plate on the seat to have the immovable portion located thereon, a second plate located above the movable portion and supported by a plurality rods extending from the first plate.

9. The testing apparatus and supporting device of claim 8, wherein the receiving structure comprises a channel cooperatively defined by a heating groove in a face of the immovable portion and a positioning groove in a face of the movable portion confronting the immovable portion.

10. The testing apparatus and supporting device of claim 8, wherein a thermally insulating plate is sandwiched between the immovable portion and the first plate.

11. The testing apparatus and supporting device of claim 8 further comprising a driving device mounted on the second plate, the driving device connecting with the movable portion and capable of driving the movable portion to move away from and towards the immovable portion.

12. A performance testing apparatus for a heat pipe comprising:
- an immovable portion having a heating member located therein for heating an evaporating section of the heat pipe;
- a movable portion capable of moving relative to the immovable portion;
- a receiving structure being defined between the immovable portion and the movable portion for receiving the evaporating section of the heat pipe therein; and
- at least one temperature sensor being attached to at least one of the immovable portion and the movable portion for thermally contacting the heat pipe in the receiving structure for detecting temperature of the heat pipe;
- wherein the receiving structure is a channel defined between the immovable portion and the movable portion;
- wherein the at least a temperature sensor has a detecting section thereof exposed to the channel;
- wherein at least one of the immovable portion and the movable portion has at least one positioning structure communicating with the channel, the at least one temperature sensor being positioned in the at least one positioning structure;
- wherein the at least a temperature sensor comprises two wires, each of the two wires comprising first and second sections and the detecting section being located between the first and second sections; and
- wherein the at least one positioning structure of one of the immovable portion and the movable portion defines two pairs of through holes therein, and wherein each of the two wires has the first section thereof extending in one of the through holes, the second section fitted in another through hole, and the detecting section located at a bottom of the positioning structure for contacting with the heat pipe, and wherein an end of the second section extends away from the another through hole for connecting with a monitoring computer.

* * * * *